United States Patent
Forster et al.

(10) Patent No.: US 11,710,886 B2
(45) Date of Patent: Jul. 25, 2023

(54) FOIL LAMINATE INTERMEDIATE AND METHOD OF MANUFACTURING

(71) Applicant: Avery Dennison Retail Information Services, LLC, Mentor, OH (US)

(72) Inventors: Ian J. Forster, Essex (GB); Peter Cockerell, Nottinghamshire (GB); Norman Howard, Essex (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/013,470

(22) Filed: Sep. 4, 2020

(65) Prior Publication Data

US 2020/0403291 A1    Dec. 24, 2020

Related U.S. Application Data

(62) Division of application No. 14/064,873, filed on Oct. 28, 2013, which is a division of application No.
(Continued)

(51) Int. Cl.
*B23K 26/00* (2014.01)
*B32B 38/00* (2006.01)
(Continued)

(52) U.S. Cl.
CPC .......... *H01P 11/003* (2013.01); *B23K 26/364* (2015.10); *B32B 38/10* (2013.01);
(Continued)

(58) Field of Classification Search
None
See application file for complete search history.

(56) References Cited

U.S. PATENT DOCUMENTS 2,961,746 A    11/1960  Lyman
3,240,647 A  *  3/1966  Morgan ................. H05K 3/281
                                                     156/249
(Continued)

FOREIGN PATENT DOCUMENTS

CN    1434958    8/2003
CN    1744109    3/2006
(Continued)

OTHER PUBLICATIONS

Written Opinion of the International Searching Authority dated Mar. 20, 2008, issued in corresponding IA No. PCT/US2007/001048 filed Jan. 16, 2007.
(Continued)

*Primary Examiner* — Linda L Gray

(57) ABSTRACT

The present invention relates to a method of manufacturing a metal foil laminate which may be used for example to produce an antenna for a radio frequency (RFID) tag, electronic circuit, photovoltaic module or the like. A web of material is provided to at least one cutting station in which a first pattern is generated in the web of material. A further cutting may occur to create additional modifications in order to provide additional features for the intended end use of the product. The cutting may be performed by a laser either alone or in combinations with other cutting technologies.

4 Claims, 11 Drawing Sheets

Related U.S. Application Data

13/160,289, filed on Jun. 14, 2011, now Pat. No. 9,876,265.

(60) Provisional application No. 61/354,393, filed on Jun. 14, 2010, provisional application No. 61/354,380, filed on Jun. 14, 2010, provisional application No. 61/354,388, filed on Jun. 14, 2010.

(51) Int. Cl.

| | | |
|---|---|---|
| *G06K 19/00* | (2006.01) | |
| *B32B 37/00* | (2006.01) | |
| *H01P 11/00* | (2006.01) | |
| *B23K 26/364* | (2014.01) | |
| *B32B 38/10* | (2006.01) | |
| *G06K 19/077* | (2006.01) | |
| *G06K 19/07* | (2006.01) | |
| *B32B 37/12* | (2006.01) | |

(52) U.S. Cl.
CPC ..... *G06K 19/0723* (2013.01); *G06K 19/0775* (2013.01); *G06K 19/07718* (2013.01); *G06K 19/07749* (2013.01); *G06K 19/07754* (2013.01); *G06K 19/07786* (2013.01); *B32B 37/12* (2013.01); *B32B 38/145* (2013.01); *B32B 2305/10* (2013.01); *B32B 2307/302* (2013.01); *B32B 2317/12* (2013.01); *B32B 2519/02* (2013.01); *Y10T 29/49016* (2015.01); *Y10T 29/49018* (2015.01); *Y10T 29/49117* (2015.01); *Y10T 29/49156* (2015.01); *Y10T 29/5317* (2015.01); *Y10T 29/53174* (2015.01); *Y10T 156/1052* (2015.01); *Y10T 428/24802* (2015.01); *Y10T 428/24917* (2015.01); *Y10T 428/2809* (2015.01); *Y10T 428/2817* (2015.01)

(56) References Cited

U.S. PATENT DOCUMENTS

| | | |
|---|---|---|
| 3,938,931 A | 2/1976 | Emmel |
| 4,369,557 A | 1/1983 | Vandebult |
| 4,664,966 A | 8/1987 | Bailey et al. |
| 4,711,996 A | 12/1987 | Drexler |
| 4,717,438 A | 1/1988 | Benge et al. |
| 4,730,095 A | 3/1988 | Richter-Jorgensen |
| 4,745,288 A | 5/1988 | Hurley et al. |
| 4,900,386 A | 2/1990 | Richter-Jorgensen |
| 5,142,270 A | 8/1992 | Appalucci et al. |
| 5,161,276 A | 11/1992 | Hutton et al. |
| 5,331,443 A | 7/1994 | Stanisci |
| 5,434,917 A | 7/1995 | Naccache et al. |
| 5,566,441 A | 10/1996 | Marsh et al. |
| 5,632,842 A | 5/1997 | Oliver et al. |
| 5,645,932 A | 7/1997 | Uchibori |
| 5,656,115 A | 8/1997 | Tanno et al. |
| 5,708,419 A | 1/1998 | Isaacson et al. |
| 5,709,484 A | 1/1998 | Dorner |
| 5,725,935 A | 3/1998 | Rajan |
| 5,751,256 A | 5/1998 | McDonough et al. |
| 5,754,256 A | 5/1998 | Kim |
| 5,759,422 A | 6/1998 | Schmelzer et al. |
| 5,800,724 A | 9/1998 | Habeger et al. |
| 5,861,809 A | 1/1999 | Eckstein et al. |
| 6,072,383 A | 6/2000 | Gallagher, III et al. |
| 6,100,804 A | 8/2000 | Brady et al. |
| 6,147,662 A | 11/2000 | Grabau et al. |
| 6,161,276 A | 12/2000 | Droz |
| 6,164,551 A | 12/2000 | Altwasser |
| 6,191,328 B1 | 2/2001 | Kitano et al. |
| 6,191,382 B1 | 2/2001 | Damikolas |
| 6,259,369 B1 | 7/2001 | Monico |
| 6,265,977 B1 | 7/2001 | Vega et al. |
| 6,313,747 B2 | 11/2001 | Imaichi et al. |
| 6,320,556 B1 | 11/2001 | Cyman et al. |
| 6,333,721 B1 | 12/2001 | Altwasser |
| 6,352,497 B1 | 3/2002 | Hensley et al. |
| 6,353,420 B1 | 3/2002 | Chung |
| 6,400,323 B2 | 6/2002 | Yasukawa et al. |
| 6,424,315 B1 | 7/2002 | Glenn et al. |
| 6,451,154 B1 | 9/2002 | Grabau et al. |
| 6,466,131 B1 | 10/2002 | Tuttle et al. |
| 6,476,775 B1 | 11/2002 | Oberle |
| 6,509,837 B1 | 1/2003 | Tuttle et al. |
| 6,609,844 B1 | 8/2003 | Petteruti et al. |
| 6,698,116 B2 | 3/2004 | Waldron |
| 6,781,508 B2 | 8/2004 | Tuttle et al. |
| 6,836,215 B1 | 12/2004 | Laurash et al. |
| 6,839,029 B2 | 1/2005 | Mendolia et al. |
| 6,933,892 B2 | 8/2005 | Oberle |
| 6,940,408 B2 | 9/2005 | Ferguson et al. |
| 6,988,666 B2 | 1/2006 | Appalucci et al. |
| 7,014,729 B2 | 3/2006 | Grabau et al. |
| 7,047,624 B2 | 5/2006 | Vogt |
| 7,116,227 B2 | 10/2006 | Eckstein et al. |
| 7,122,235 B2 | 10/2006 | Bourdelais et al. |
| 7,176,053 B1 | 2/2007 | Dimmler |
| 7,224,280 B2 | 5/2007 | Ferguson et al. |
| 7,245,227 B2 | 7/2007 | Winter |
| 7,250,868 B2 | 7/2007 | Kurz et al. |
| 7,256,738 B2 | 8/2007 | Uchibori et al. |
| 7,283,035 B2 | 10/2007 | Tuttle et al. |
| 7,284,704 B2 | 10/2007 | Bow |
| 7,300,863 B2 | 11/2007 | Pennaz et al. |
| 7,309,007 B2 | 12/2007 | Kean |
| 7,345,575 B2 | 3/2008 | Tuttle et al. |
| 7,374,095 B2 | 5/2008 | Blank et al. |
| 7,463,150 B2 | 12/2008 | Rajan |
| 7,477,194 B2 | 1/2009 | Coleman et al. |
| 7,497,004 B2 | 3/2009 | Cote et al. |
| 7,520,001 B2 | 4/2009 | Gotoh et al. |
| 7,533,455 B2 | 5/2009 | Wehr |
| 7,540,428 B2 | 6/2009 | Baba et al. |
| 7,546,671 B2 | 6/2009 | Finn |
| 7,555,826 B2 | 7/2009 | Armijo et al. |
| 7,559,131 B2 | 7/2009 | Credelle et al. |
| 7,621,451 B2 | 11/2009 | Berson |
| 7,633,035 B2 | 12/2009 | Kirmeier |
| 7,641,112 B2 | 1/2010 | Jensen et al. |
| 7,650,683 B2 | 1/2010 | Forster et al. |
| 7,681,301 B2 | 3/2010 | Rodgers |
| 7,836,588 B2 | 11/2010 | Laksin et al. |
| 7,855,645 B2 | 12/2010 | Rajan |
| 7,880,615 B2 | 2/2011 | Kobayashi et al. |
| 7,893,385 B2 | 2/2011 | Rodgers |
| 7,930,815 B2 | 4/2011 | Coleman et al. |
| 7,997,495 B2 | 8/2011 | Rodgers |
| 8,033,477 B2 | 10/2011 | Jones et al. |
| 8,063,783 B2 | 11/2011 | Miyashita et al. |
| 8,132,734 B2 | 3/2012 | Lazarowicz et al. |
| 8,146,830 B2 | 4/2012 | Johnson et al. |
| 8,178,028 B2 | 5/2012 | Gandhi |
| 8,191,230 B2 | 6/2012 | Coleman et al. |
| 8,202,567 B2 | 6/2012 | Ie et al. |
| 8,702,893 B2 | 4/2014 | Peters et al. |
| 8,786,510 B2 | 7/2014 | Coleman et al. |
| 8,981,936 B2 | 3/2015 | Forster et al. |
| 9,039,866 B2 | 5/2015 | Forster et al. |
| 9,231,290 B2 | 1/2016 | Forster et al. |
| 2002/0018880 A1 | 2/2002 | Young |
| 2002/0025416 A1 | 2/2002 | Uchibori |
| 2003/0051806 A1 | 3/2003 | Appalucci et al. |
| 2003/0112202 A1 | 6/2003 | Vogt |
| 2003/0136503 A1 | 7/2003 | Green et al. |
| 2004/0075616 A1 | 4/2004 | Endo et al. |
| 2004/0078957 A1 | 4/2004 | Forster et al. |
| 2004/0177492 A1 | 9/2004 | Eckstein et al. |
| 2004/0221952 A1 | 11/2004 | Hirschmann et al. |
| 2004/0224135 A1 | 11/2004 | Krebs |
| 2005/0001785 A1 | 1/2005 | Ferguson et al. |
| 2005/0034995 A1 | 2/2005 | Gundlach et al. |
| 2005/0035927 A1 | 2/2005 | Kimura |
| 2005/0083627 A1 | 4/2005 | Wang et al. |

(56) References Cited

U.S. PATENT DOCUMENTS

| | | |
|---|---|---|
| 2005/0089664 A1 | 4/2005 | Utz et al. |
| 2005/0183817 A1 | 8/2005 | Eckstein et al. |
| 2005/0197074 A1 | 9/2005 | Cullen et al. |
| 2005/0198811 A1 | 9/2005 | Kurz et al. |
| 2005/0205202 A1 | 9/2005 | Chaoui et al. |
| 2005/0206524 A1 | 9/2005 | Forster et al. |
| 2005/0230486 A1 | 10/2005 | Halope |
| 2005/0230791 A1 | 10/2005 | Kanda et al. |
| 2005/0231371 A1 | 10/2005 | Rowe et al. |
| 2005/0274811 A1 | 12/2005 | Zercher |
| 2005/0284917 A1 | 12/2005 | Clare et al. |
| 2005/0284941 A1 | 12/2005 | Bow |
| 2006/0244662 A1 | 11/2006 | Bauer et al. |
| 2007/0012775 A1 | 1/2007 | Cote |
| 2007/0020932 A1 | 1/2007 | Maruyama et al. |
| 2007/0040686 A1 | 2/2007 | Reis |
| 2007/0078957 A1 | 4/2007 | Ypya et al. |
| 2007/0094862 A1 | 5/2007 | Posamentier |
| 2007/0102190 A1 | 5/2007 | Sakamoto |
| 2007/0130754 A1 | 6/2007 | Fein |
| 2007/0171129 A1* | 7/2007 | Coleman .......... H01Q 7/00 343/700 MS |
| 2007/0188327 A1 | 8/2007 | Keeton et al. |
| 2007/0246843 A1 | 10/2007 | Yang et al. |
| 2008/0047129 A1 | 2/2008 | Say et al. |
| 2008/0047130 A1 | 2/2008 | Lin et al. |
| 2008/0083706 A1 | 4/2008 | Kirmeier |
| 2008/0120834 A1 | 5/2008 | Laksin et al. |
| 2008/0128397 A1 | 6/2008 | Gandhi |
| 2008/0128493 A1 | 6/2008 | Jones et al. |
| 2008/0217309 A1 | 9/2008 | Rodgers |
| 2008/0277069 A1 | 11/2008 | Tharp |
| 2009/0033582 A1 | 2/2009 | Blenkhorn et al. |
| 2009/0230196 A1 | 9/2009 | Johnson et al. |
| 2010/0071831 A1 | 3/2010 | Peters et al. |
| 2010/0089535 A1 | 4/2010 | Hosono et al. |
| 2010/0103238 A1 | 4/2010 | Neuhard et al. |
| 2010/0320275 A1 | 12/2010 | Fu |
| 2011/0220276 A1 | 9/2011 | Coleman et al. |
| 2012/0060359 A1 | 3/2012 | Forster et al. |
| 2012/0061473 A1 | 3/2012 | Forster et al. |
| 2012/0090877 A1 | 4/2012 | Forster et al. |
| 2012/0280047 A1 | 11/2012 | Forster et al. |
| 2013/0055555 A1 | 3/2013 | Forster et al. |
| 2014/0034739 A1 | 2/2014 | Forster et al. |
| 2014/0047703 A1 | 2/2014 | Forster et al. |
| 2017/0344864 A1* | 11/2017 | Forster .......... G06K 19/07775 |

FOREIGN PATENT DOCUMENTS

| | | |
|---|---|---|
| CN | 101300591 | 1/2008 |
| CN | 101241560 | 8/2008 |
| CN | 101288088 | 10/2008 |
| CN | 101375463 | 2/2009 |
| CN | 201352357 | 11/2009 |
| CN | 101297307 | 6/2010 |
| CN | 101541555 | 8/2011 |
| CN | 101341501 | 11/2012 |
| DE | 4000372 | 7/1991 |
| DE | 3732825 | 6/1995 |
| DE | 4422338 | 1/1996 |
| DE | 20005940 | 9/2000 |
| DE | 69617753 | 8/2002 |
| DE | 19921130 | 3/2003 |
| EP | 1120796 | 2/2004 |
| EP | 0790123 | 10/2005 |
| EP | 0665705 | 8/2009 |
| GB | 869076 | 5/1961 |
| GB | 1294158 | 10/1972 |
| JP | 1995-100793 | 4/1995 |
| JP | 2001-127410 | 5/2001 |
| JP | 4334704 | 9/2009 |
| TW | 200811717 | 3/2008 |
| WO | 99/51386 | 10/1999 |
| WO | 2001/054058 | 7/2001 |
| WO | 2001/054226 | 7/2001 |
| WO | 03/024708 | 3/2003 |
| WO | 2003/054708 | 7/2003 |
| WO | 03/107266 | 12/2003 |
| WO | 2005/083627 | 9/2005 |
| WO | 2005/089143 | 9/2005 |
| WO | 2007/053355 | 5/2007 |
| WO | 2007/087189 | 8/2007 |
| WO | 2009/101249 | 8/2009 |
| WO | 2009/118455 | 10/2009 |
| WO | 2008/148527 | 6/2014 |

OTHER PUBLICATIONS

International Preliminary Report on Patentability dated May 2, 2011 issued in corresponding IA No. PCT/US2007/001048 filed Jan. 16, 2007.
International Search Report and Written Opinion dated Sep. 28, 2007 issued in corresponding IA No. PCT/US2007/001048 filed Jan. 16, 2007.
Definition of RFID, Technology.com, printed Mar. 18, 2014, 1 page.
"Finecut Narrow Web Laser Cutting System," Spartanics(R), www.spartanics.com, 2 pages, no date shown.
"Finecut Laser Cutting Systems," Spartanics(R), www.spartanics.com, 4 pages, no date shown.
"Fineprint Flatbed Screen Printing Line, Roll-to-Roll," Spartanics(R), www.spartanics.com, 2 pages, no date shown.
"Cold Foil for Dummies(R)," J. Michael Rivera, Wiley Publishing, Inc., copyright 2004.
International Search Report and Written Opinion dated Oct. 6, 2011 issued in corresponding IA No. PCT/US2011/040379 filed Jun. 14, 2011.
International Search Report and Written Opinion dated Oct. 6, 2011 issued in corresponding IA No. PCT/US2011/040383 filed Jun. 14, 2011.
International Search Report and Written Opinion dated Oct. 13, 2011 issued in corresponding IA No. PCT/US2011/041743 filed Jun. 24, 2011.
International Search Report and Written Opinion dated Oct. 6, 2011 issued in corresponding IA No. PCT/US2011/040391 filed Jun. 14, 2011.
International Search Report and Written Opinion dated Jan. 12, 2012 issued in corresponding IA No. PCT/US2011/040386 filed Jun. 14, 2011.
International Preliminary Report on Patentability dated Dec. 14, 2012 issued in corresponding IA No. PCT/US2011/040386 filed Jun. 14, 2011.
European Search Report dated Feb. 16, 2016 issued in EP13005668.
Extended European Search Report dated Feb. 9, 2010 issued in EP07762542.
Partial European Search Report dated May 16, 2014 issued in EP13005668.
International Preliminary Report on Patentability dated Dec. 14, 2012 issued in corresponding IA No. PCT/US2011/040379 filed Jun. 14, 2011.
International Preliminary Report on Patentability dated Dec. 14, 2012 issued in corresponding IA No. PCT/US2011/040383 filed Jun. 14, 2011.
International Preliminary Report on Patentability dated Dec. 28, 2012 issued in corresponding IA No. PCT/US2011/041743 filed Jun. 24, 2011.
International Preliminary Report on Patentability dated Dec. 14, 2012 issued in corresponding IA No. PCT/US2011/040391 filed Jun. 14, 2011.

\* cited by examiner

FOIL LAMINATE INTERMEDIATE AND METHOD OF MANUFACTURING

CROSS-REFERENCE TO RELATED APPLICATION

The present application is a divisional of U.S. patent application Ser. No. 14/064,873 filed Oct. 28, 2013, which is a divisional of U.S. patent application Ser. No. 13/160,289 filed Jun. 14, 2011, which claims the benefit of U.S. Provisional Application Nos. 61/354,380 filed Jun. 14, 2010, 61/354,388 filed Jun. 14, 2010, and 61/354,393 filed Jun. 14, 2010, all of which are incorporated herein by reference in their entireties.

FIELD OF THE INVENTION

The present invention is in the field of foil laminate assemblies and methods of making such assemblies. More particularly the present invention relates to a patterned foil intermediate assembly produced by or finished through laser cutting that may be used in forming various conductive structures, photovoltaic arrangements, reflective assemblies or other constructions.

BACKGROUND OF THE INVENTION

Foil laminates and various intermediate assemblies are currently used in a number of applications, ranging from containers for microwave packages to smart cards. Such laminates have regularly been created by die cutting, stamping and other mechanical processes that generally lend themselves well to high speed situations in which a relatively simple shape or pattern can be created.

The increased demand for circuits has created a need for a manufacturing method that can quickly and efficiently produce such circuits. One such method is disclosed in U.S. Patent Application No. 2007/0171129 A1. This method includes the steps of, first, providing a reinforced metal foil laminate having a metal foil layer bonded to a reinforcement layer, and a carrier layer bonded to the metal foil laminate. The method includes the step of using a rotary die cutter to cut an antenna pattern through the metal foil laminate to the carrier layer. The method concludes with the step of removing an undesired matrix portion of the reinforced metal foil laminate to provide a metal foil laminate antenna disposed on the carrier layer.

Use of a rotary die cutter to cut a circuit pattern can be advantageous because rotary die cutting is both fast and inexpensive. However, rotary die cutters have poor resolution, and are limited to having a minimum distance between cut lines of 1 mm. An additional problem with using a rotary die cutter to cut a circuit or other construction requiring high precision is that the cylindrical die used by the rotary die cutter cannot be quickly or easily changed. Accordingly, the circuit design is not readily changeable, and thus it is often not economically feasible to produce small batches of a particular circuit design due to the need to constantly change out die heads. Furthermore, any change in a circuit design would require a large lead-time, as a new cylindrical die must be manufactured each time the circuit design is changed. Having a large number of designs can lead to a large inventory of die heads, the storage of which can occupy valuable factory floor space.

Conventional stamping techniques also suffer from similar drawbacks, in that the stamping die cannot be readily changed for a new design and stamping dies may not generally be able to produce designs having very slight tolerances. An example of stamping foils is shown by US 2002/0018880. Publications, patents and patent applications are referred to throughout this disclosure. All references cited herein are hereby incorporated by reference.

What is needed therefore is an improved method of manufacturing small batches of intricate structures that can be used for a variety of purposes without suffering from the foregoing drawbacks.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to using a computer controlled laser to cut one or more patterns in a metal foil layer to create structures that may be subsequently modified for use in a variety of applications. The present invention allows for the creation of very intricate designs and shapes as well as provides the ability to produce varying amounts of structures.

In one exemplary embodiment of the presently described invention, a foil laminate intermediate assembly is provided and includes a substrate that has first and second faces. A pattern of adhesive is disposed on the first face of the substrate. A metal foil is applied over the pattern of adhesive. The metal foil has at least a first pattern with the at least first pattern corresponding to at least a portion of the pattern of adhesive.

In a further exemplary embodiment, a method of making a patterned metal foil or conductive laminate, is described and includes the steps of initially providing a metal foil or conductive material that has first and second sides. Next, an adhesive is brought into contact with the second side of the metal foil. Then a first pattern is cut in the metal foil or conductive material to create a first foil pattern and a matrix. The matrix is removed from the first foil pattern and then a second pattern is cut in the metal foil to create a second foil pattern. The first and second patterns may cooperate with one another or may serve different functions from one another.

In a further exemplary embodiment, a method of making a conductive pattern is described and includes the steps of initially providing a metal foil or conductive material laminate, the metal foil laminate having a foil layer, an adhesive layer beneath the foil layer, and a substrate beneath the adhesive layer. A first cut is made in the metal foil laminate to create a first pattern in only the foil layer. That is, the cut only extends the depth of the foil layer and not the depth of the entire laminate or into the surface of the carrier layer. Energy generated by the laser may create a weakness in the metal foil laminate if the laminate were immediately subject to further processing and, as such, the energy is allowed to dissipate and a second cut is made in the metal foil laminate to create a second pattern only in the foil or conductive layer. The second pattern is distinct from the first pattern.

In a still further exemplary embodiment, a web of foil or conductive laminate intermediate assemblies is described and includes a web that has first and second sides. A plurality of foil laminate intermediates is provided on the web. Each of the foil laminate intermediate assemblies includes a substrate that has first and second faces, a pattern of adhesive disposed on the first face of the substrate, and a metal foil applied over the pattern of adhesive. The metal foil has at least a first pattern with the at least first pattern corresponding to at least a portion of the pattern of adhesive.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present invention relates to a unique and efficient method for producing intermediate assemblies that may be used in the creation of intricately formed circuits, antennas, photovoltaic modules and other specialized applications or devices such as straps.

Figure 1:
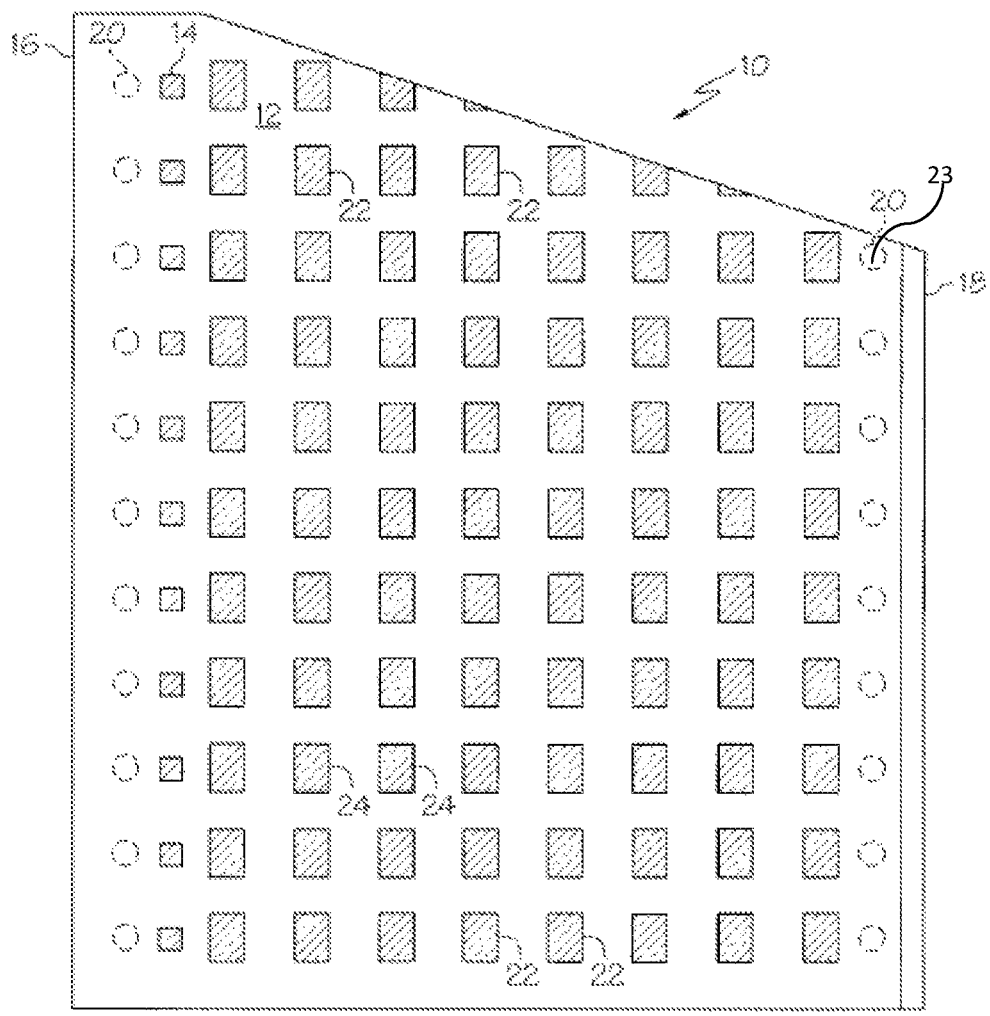
FIG. 1 depicts a partial section of a web having a plurality of foil or conductive laminates disposed on the surface of the web.

Reference is now directed to FIG. 1 which shows a web 10 having a number of foil laminates 22 provided on the surface 12 of the web 10. The web 10 is provided with a series of printed registration marks 14 along one of the first and second longitudinally extending side edges 16 and 18. The registration marks 14 may also be printed on the transversely extending edges of the web (not shown). The registration marks 14 assist in alignment of the foil laminates 22 and cutting to be described herein. As shown adjacent to the registration marks 14 and along each of the longitudinal edges 16, 18 as well as the transversely extending edges are printed patterns of adhesive 20 (shown in phantom). The printed adhesive patterns 20 further aid in the alignment of the foil laminates 22 as well as in the cutting. The adhesive may include optical brighteners 23. In a preferred embodiment, the optical brighteners 23 are a fluorescent powder that is approximately 1% by weight of the adhesive and more preferably about 0.5% by weight of the adhesive. Other triggers or signals can be used to initiate the laser and register the patterns to be formed in the web such as cuts or slits in the web, taggant inks, printing inks and the like.

The optical brighteners 23 may be provided in the area where the cutting of at least one pattern 24 for a foil or conductive laminate 22 is to occur in the foil laminate layer 145. The optical brighteners 23 may be printed on top of the adhesive layer 20 rather than mixed within the adhesive layer. Additionally, it is contemplated by the present invention that the optical brighteners 23 may be printed on top of the substrate as opposed to mixed or on top of the adhesive layer 20. In this embodiment, it is preferred that the adhesive layer 20 is clear or transparent so that the optical brighteners 23 may be seen through the adhesive layer.

Additionally, in one embodiment of the present invention, optical brighteners 23 may be printed in the shape of the foil or conductive laminates 22 that are going to be constructed out of the foil or conductive layer or material.

The present invention also contemplates that the optical brighteners themselves may serve as registration mark 14 patterned along the longitudinally and/or transversely extending sides of the pattern of adhesive 20. The foil layer 145 when laid over the carrier web does not cover the registration marks 14 made out of optical brighteners so as to allow the cutting mechanism to detect the registration marks in order to align the plurality of foil laminates 22. That is, the foil or conductive layer 145 is disposed between the registration marks which are provided for example on the margins or edge portions of the carrier web.

In another embodiment the registration marks 14 may be printed using a wide variety of inks applied on top of individual optical brighteners 23. Alternatively, the registration marks 14 may also be created from portions of the conductive layer or fragments of the foil laminate, or alternatively, slits, punches or cuts in the web.

Figure 20:
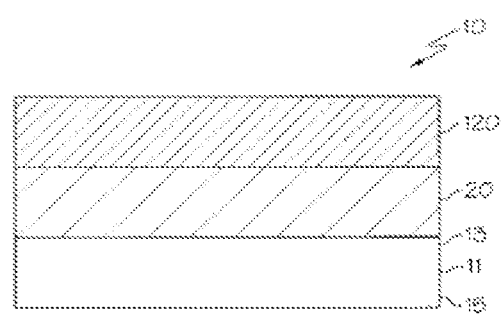
FIG. 20 illustrates a cross section of the web of the present invention prior to patterning.

As illustrated in FIG. 20, the web 10 prior to patterning by a cutting mechanism includes a substrate 11 that has a first face 13 and second face 15, with an adhesive layer provided over the first face 13 of the web. The adhesive layer 20 may be patterned onto the first face 13 of the substrate 11 or flood coated onto the first face of the substrate. The patterns may include a plurality of geometrical shapes that are provided on the first face 13 of the substrate 11. Specified portions of the first face 13 of the substrate 11 are covered with adhesive and other portions of the first face 13 of the substrate 11 are not covered with adhesive. Next, the web 10 is advanced and a print varnish is provided over areas of the adhesive layer in order to deaden areas of the adhesive where the foil or conductive structures 22 will not be produced. That is, after the coating with the print varnish or other curable material, a pattern of adhesive is created or remains that will exactly mirror the area where the foil laminates are formed. No deadening of the pattern of adhesive occurs so that the adhesive remains tacky. If the adhesive layer is patterned onto the first face 13 of the substrate 11, deadening of certain areas of the adhesive layer may be avoided, that is the patterns of adhesive will be created in patterns that will match or mirror the antenna structure.

Next, a foil sheet, such as aluminum having a thickness of approximately 15 microns is applied over the web 10 and portions of the foil adhere to the active adhesive areas where the foil or conductive laminates are to be formed and do not adhere to the remainder of the web where the foil laminates will be formed. After the foil has been laminated to the web 10, a targeting light shines to detect the registration marks to provide for alignment of the first cutting pattern 24, which is preferably done by a laser. It should however be understood that the first cutting pattern can be accomplished by other cutting devices as may be suitable, such as a die cutter, stamping press, cold foil process or other laser controlled cutting devices.

As used herein an exemplary cold foil process refers to printing an adhesive or other curable pattern onto a substrate then applying a foil layer over the pattern, laminating the foil to the pattern so that the foil sticks to the pattern and then stripping away the foil, leaving the pattern on the substrate covered with the foil layer.

The first pattern 24 is cut and creates, in this exemplary embodiment, 100 micron wide traces. Then, the excess foil around the area where the structures are formed is removed by stripping as will be further described herein.

The laser cutting device can further be used to create alignment areas in the foil material to aid in the attachment of integrated circuit, e.g. chip, finish cutting of additional patterns or the like. With respect to the placement of a chip, fiducials can be formed in the foil, having a dimension of approximately 0.5 mm, to provide for alignment of the chip so that it can be connected to the attachment point.

Figure 2:
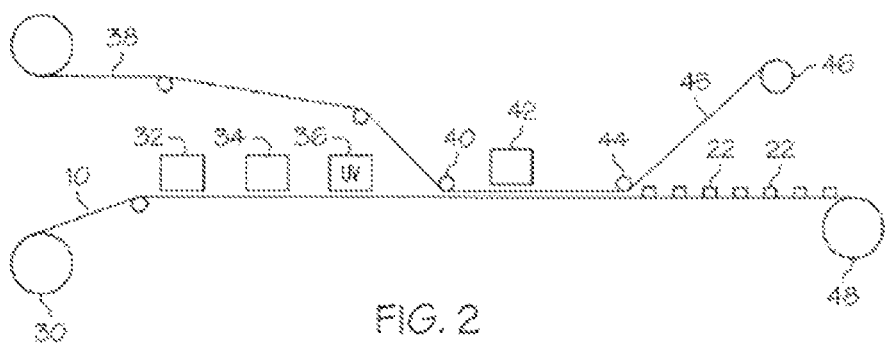
FIG. 2 is a schematic showing the process for creating the web depicted in FIG. 1.

Attention is now directed to FIG. 2 which provides a schematic view for producing the web 10 illustrated in FIG. 1. The web 10 of material, such as PET, is unwound from a roller 30. The web 10 passes beneath a printing station 32 which provides the visible registration marks. An adhesive applicator 34 applies the adhesive layer and creates the adhesive pattern 20. Next, a UV source 36 is directed over the adhesive to deaden select areas of the adhesive, leaving active areas where the foil antennas 22 will be formed. A foil web 38 is partially laminated by roller 40 to the adhesive coated web 10. A laser cutter 42 detects the registration marks 14 and/or the pattern coated adhesive marks 20 to cut the first pattern 24 in the foil 38. It should be noted that the energy from the laser does not score or mark the underlying substrate web.

Once the first pattern 24 is cut into the foil 38, the remaining foil 45 is stripped off by stripper 44 and rewound at 46. As the foil 38 is not fully laminated to the web, removal of the foil thus creates a 100% fully recyclable material as the foil is not contaminated with adhesive nor has portions of the substrate connected to the foil.

The foil 38 that remains is due to the adhesive patterns that were created to form the individual foil antenna laminates 22, which are the areas of the adhesive that were not deadened. The web 10 is then wound at 48. The web 10 after forming of the individual antenna/laminates 22 may alternatively be sent through a cutter to separate the individual foil antennas 22 from one another or the web 10 may be cut at a later date when forming individual devices. As will be described herein, the web 10 may also undergo a second or third or more cuttings depending on the particular end use to be made of the foil laminate 22.

Additional cuttings can be used to create some level of personalization in the material, such as logos, names, trademarks and the like or to indicate the identity of a manufacturer, date of production or the like. This is accomplished through the computer controlled laser cutter.

Figure 3:
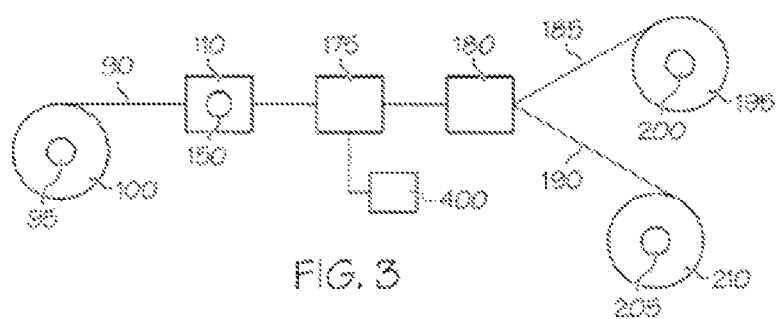
FIG. 3 depicts a roll-to-roll process for manufacturing a standard RFID antenna structure in accordance with an aspect of the present invention.

A further schematic illustration of an apparatus by which the structure 22 is created is set forth in FIG. 3, which shows a roll-to-roll process for manufacturing a conductive structure 22 in accordance with an aspect of the present invention. It should be understood that the process is readily interchangeable with a sheet fed type of manufacturing operation.

Figure 7:
FIG. 7 is a top view of an exemplary primary laser cutting path utilized by the present invention.

A web 90 is dispensed via an unwinder 95 from a web roll 100 and fed to a first cutting station, e.g. a laser, rotary die cutter, cold foil process, 110 which has a rotary die 150 if the station is a die cutting unit or a printing plate with a cold foil process. The web 90 exits a first cutter 110, and is fed into a laser cutter 175. A laser cutting path 215 (not shown, and an exemplary embodiment of which is provided in detail in FIG. 7) is programmed into a computer 400 that controls the laser cutter 175.

An exemplary laser suitable for use in the present invention includes an ytterbium laser, which pulses at about 48 kHz in a wavelength of 1024 nm. Ideally, the energy of the laser is not apparent from the surface of the substrate that is, there are no darkened areas, burns, die strikes or any surface roughness or irregularities.

Continuing with reference to FIG. 3, the web 90 exits the laser cutter 175 and is fed into a stripper 180, if necessary. When provided, the stripper 180 separates the matrix web or conductive material (e.g. foil) 190 from the formed conductive structures 22 to create a conductive structure web 185. The foil is 100% recyclable. It should be noted that a reinforcement layer 135 (FIG. 4) can be provided when necessary to bolster the strength of the metal foil layer 145 so as to prevent the tearing or ripping of the metal foil layer 145 during the processing/cutting of the conductive structure web 185. The reinforcement layer can have the same width as the foil being applied or may only be used as strips of material to strengthen select areas of the foil web.

The conductive structure web 185 has a succession of structures disposed on the carrier layer 130. The conductive structure web 185 is wound into a roll 195 by a first rewinder 200, while the matrix web 190 is wound into a matrix roll 210 by a second rewinder 205.

Figure 4:
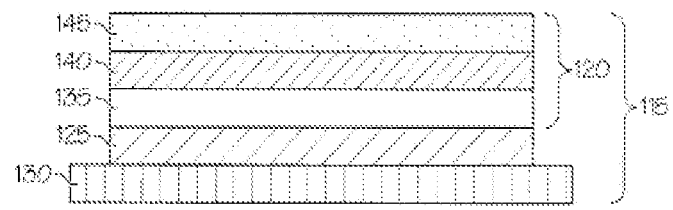
FIG. 4 is a cross sectional view of a web used in the roll-to-roll process disclosed by the present invention.
Figure 5:
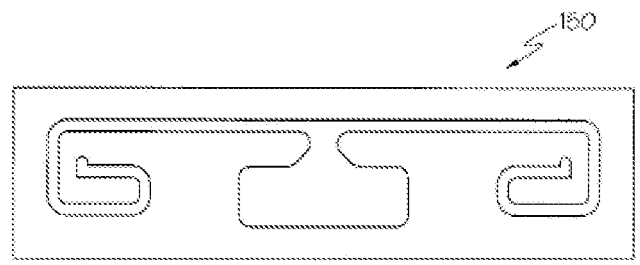
FIG. 5 is a top view of a die used by a rotary die cutter as disclosed by the present invention.

Referring now to FIG. 4, a cross sectional view of the web 115 used in the roll-to-roll process is shown. The web 115 may include a reinforced metal foil laminate layer 120 bonded to a carrier layer 130 by a first adhesive layer 125. Alternatively, the web may include only a single layer of foil which may or may not be supported by a carrier or support that is removable to support foil during the processing.

The carrier layer 130 may be made out of any material or combination of materials that allows the carrier layer 130 to be flexible so as to facilitate the manufacture of the carrier layer 130 as a continuous web that can be wound into roll form for use in a roll-to-roll process. Examples of such materials include, but are not limited to, polyester films, polyethylene terephthalate films, polyimide films, fabric (woven, non-woven, natural and synthetic) and cloth, or paper materials (card stock paper, bond paper, etc.).

The reinforced metal foil laminate layer 120 includes a metal foil layer 145 bonded to layer 135 (which may be a reinforcing layer) by a second adhesive layer 140. The metal foil layer 145 may be made out of any suitable conductive material, such as aluminum, copper, silver, gold, alloys of various metals and the like. Combinations of conductive materials may also be used. In addition, the conductive material can be created by printing of conductive ink, etching or other suitable processes. The second adhesive layer 140 may be a general-purpose permanent pressure sensitive adhesive, pressure activated adhesive, or any other suitable adhesive. The second adhesive layer 140 may be applied to layer 135 by flood coating or roll coating.

Figure 6:
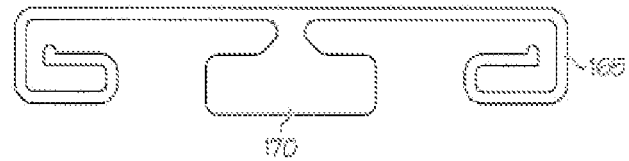
FIG. 6 is a top view of a basic antenna structure cut by the die shown in FIG. 3.

A first cutting device 110 is used to create a first pattern in the conductive material foil/laminate (an exemplary embodiment of which is shown in detail in FIG. 3) producing a first intermediate shape. The first intermediate shape does not necessarily exhibit the final design having, for example, an opening for attaching a microprocessor chip, an integrated circuit or any other configuration that will be imparted to the design to create an antenna for a final RFID device. As the web 90 is fed through the first cutter 110, the cutter 110 cuts into the web 90 up to the carrier layer 130 through the metal layer 120 and the first adhesive layer 125, thereby delineating a succession of conductive structures from an undesired portion of the metal foil laminate layer referred to as a matrix 190. An exemplary structure 165, for example an antenna structure, is shown in FIG. 6. The antenna structure 165 has a center portion 170. The antenna structure 165 does not yet have the opening defined in the center portion 170 which will be created by a second cutting pattern as will be described herein.

Figure 8:
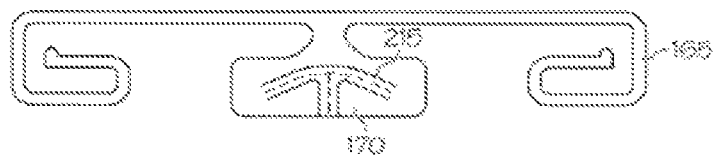
FIG. 8 is a top view showing the placement of the primary laser path shown in FIG. 7 on the basic antenna structure shown in FIG. 6.
Figure 9:
FIG. 9 is a top view of a standard antenna structure.

Referring back to FIG. 3, the web 90 exits the first cutter 110 and is fed into a second cutter 175, which is preferably a laser cutter. A laser cutting path 215 (an exemplary embodiment of which is shown in detail in FIG. 7) is programmed into a computer 400 that controls the laser cutter 175. As the web 90 is fed through the laser cutter 175, the laser cutter 175 positions or aims the laser into the cutting path 215 onto the center portion 170 of the structure 165 (e.g. antenna structure) that was created by the first cutter 110, as shown in FIG. 8. As the structures advances through the laser cutter 175, the laser cutter 175 traces the positioned laser cutting path 215 while continuously ablating the metal foil laminate layer 120 and the first adhesive layer 125 to create an opening in the center portion of the first structures, or other cuts or areas of the antenna, thereby producing a succession of finished structures in the metal foil laminate layer 180 disposed on the carrier layer 135 still surrounded by the matrix web 190. A finished structure 220, again for the purpose of this example, is an antenna for use with an RFID device, is shown in FIG. 9. The finished antenna structure has a center portion 500 having a generally T-shaped opening 230 which will accept a microprocessor chip or integrated circuit, however, it should be understood that any other shape may be used depending on the requirements of the final design or product. The generally T-shaped opening 230 defines a gap 245 that separates a first antenna contact end 240 from a second antenna contact end 250. It should be understood, that the foregoing example, forming an antenna, is intended to be an example only and the process can be used to form photovoltaic modules and other circuits, conductive structures, and constructions.

The pattern that is cut by the laser in the foil layer may also include other features which may be separate from the antenna or other structure being formed. For example, names, logos, trademarks, designs, shapes, etc. to provide advertising or marketing information or to create a particular theme or associate the product with a particular manufacturer may be added.

It should be appreciated that the laser cutter 175 ablates the metal foil laminate layer 120 and the first adhesive layer 125 to create the opening. Accordingly, no material exists in the opening for the stripper 180 to remove as the stripper 180 separates the matrix web 190 from the structure created by the first cutting process that was used to create the structure web 185. The opening is particularly narrow. Therefore, if the die 150 were shaped to also cut the opening, the material being removed from the opening during the separation of the antenna structure web 185 from the matrix web 190 would likewise be particularly narrow, and therefore weak and especially prone to tearing. Leaving material behind can be problematic, as the tearing could potentially damage the standard antenna structure which may destroy the functionality of the antenna such as by shorting out the circuit. Furthermore, tearing of this nature could result in material remaining in the opening that would have to be manually removed, resulting in decreased production rates and increased production costs, or the material discarded as defective. It is acceptable if however, some material remains in the ablated area(s) such as material having a dimension of less than one quarter of a wavelength, more preferably material having a dimension of less than one fifth of a wavelength and still more preferably less than one tenth of a wavelength.

While the laser cutter 175 creates the opening that defines the gap and two contact ends, it should be appreciated that the laser cutting path 215 can be easily and quickly be altered simply by loading a new laser cutting path program into the computer 400 to create other cutting or patterns to be produced in the antenna structure. Accordingly, the disclosed roll-to-roll process makes the production of small batches of very basic variations of the exemplary standard antenna structure economically sustainable or makes the production of very intricate designs more feasible. This process can also be used to add personalization and unique characteristics to the device/design being created.

Figure 10:
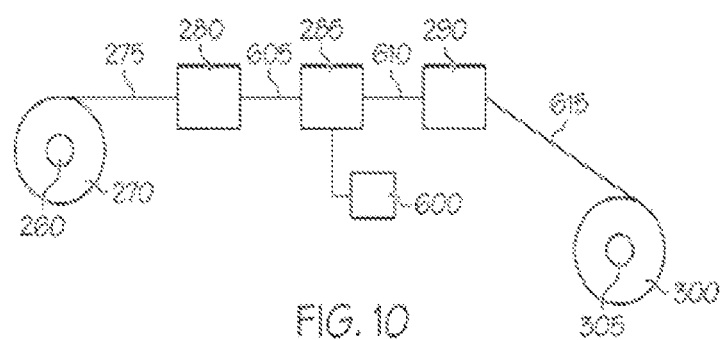
FIG. 10 depicts a roll-to-roll process for manufacturing modified RFID tags in accordance with an aspect of the present invention.

Referring now to FIG. 10, a roll-to-roll process for manufacturing a modified conductive structure in accordance with an aspect of the present invention is shown. As used herein, a modified structure refers to the process of taking a previously formed structure, in the current example an antenna for use as an RFID tag, and then further adapting that structure to meet a particular end use application or to complete the manufacture of a specific design. It should be understood that in addition to a roll to roll process, the foregoing manufacturing methods may be conducted in a sheet fed process, where individual sheets containing a conductive layer are cut and then collected such as by stacking.

A conductive structure web 275 is dispensed from roll 270 via an unwinder 260. For the purposes of this exemplary embodiment, it will be assumed that the conductive structure roll 270 shown in FIG. 10 was created by the roll-to-roll process depicted in FIG. 3. However, any other suitable methods may be employed to create the conductive structure roll 270, and as used in the current example, so long as microprocessors may be directly attached to the antenna structures disposed on the antenna structure web 275 without the use of contact extensions. The antenna structure web 275 is fed into an integrated circuit (IC) attachment apparatus 280. The IC attachment apparatus 280 secures an IC to the structures being advanced through the IC attachment apparatus 280 thereby creating a direct electrical connection between the IC and the structure. It should be understood that while direct chip attachment is one use for the present invention, straps may also be used with the process and may facilitate being able to quickly change or design the device being made.

After leaving the IC attachment, the RFID tag, in general 50, has a structure 55, a center portion 60 with an opening 65 with the opening defining a gap 70. The IC attachment or placement apparatus 280 secures the IC 85 to the structure 55 at the first contact end 75, and the other end of the IC 85 to the second contact end 80 such that the IC extends across the gap 70 (see FIGS. 13 and 14). The IC attachment or placement apparatus 280 can secure the microprocessor 85 to the structure 55 via an electrically conductive adhesive, a weld (e.g., spot weld), ultrasonic bonding, mechanical crimping or by any other suitable means that allow an electrical current to flow through the microprocessor 100 and around the antenna structure 55.

It should be appreciated that the high-resolution cutting capabilities of the laser cutter 175 allow the laser cutter 175 to create a gap that is narrow enough to allow for the direct attachment of an IC to the standard structure without the use of any contact extensions. The absence of contact extensions can be advantageous, as it simplifies the manufacturing process, decreases manufacturing costs, and eliminates a potential failure point. However, straps or contact extensions may be used with the current process.

Referring back to FIG. 10, the antenna structure web 275 exits the IC attachment machine 280 in one exemplary embodiment as a RFID tag web 605. The RFID tag web 605 has a succession of RFID tags disposed on the carrier layer. It should be understood that the foregoing process can be used to make any number of products or conductive assemblies such as photovoltaic arrangements, reflective assemblies or other constructions.

Figure 11:
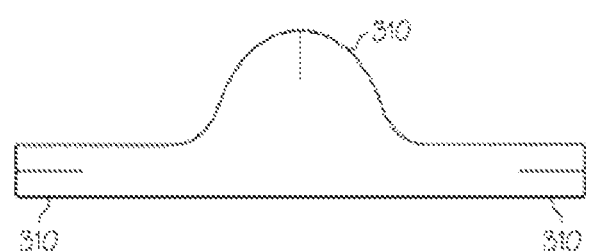
FIG. 11 is a top view of an exemplary secondary cutting path utilized by the present invention.
Figure 12:
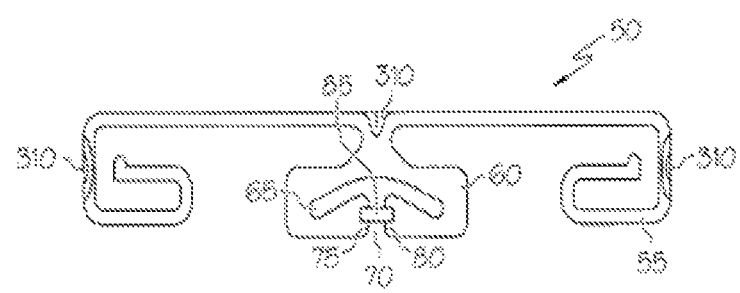
FIG. 12 is a top view showing the placement of the secondary cutting path shown in FIG. 10 on the conductive structure shown in FIG. 9.

The RFID tag web 605 is fed into a second or subsequent laser cutter 285 to make the modifications to the initial antenna structure. A supplementary laser cutting path 310 (an exemplary embodiment of which is shown in detail in FIG. 11) is programmed into a second computer 600 that controls the second laser cutter 285. As the web 605 is fed through the second laser cutter 285, the second laser cutter 285 positions the supplementary laser cutting path 310 onto the conductive structures as shown in FIG. 12. As the conductive structures advance through the second laser cutter 285, the second laser 285 cutter traces the positioned supplementary laser cutting path 310 while continuously ablating the metal foil laminate layer and the first adhesive layer to alter the shape of the conductive structure, in this example a modified antenna structure for use for example with a RFID tag.

Figure 13:
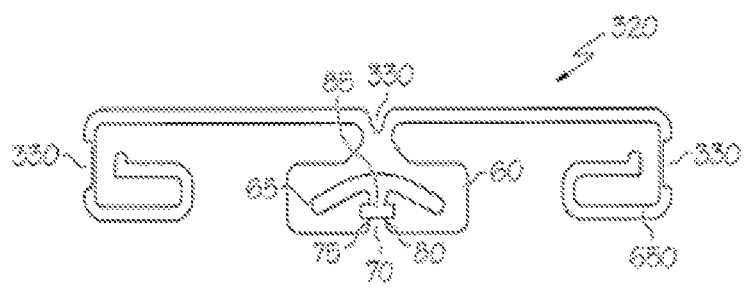
FIG. 13 is a top view of a completed modified conductive structure created by a method disclosed by the present invention.

A modified antenna structure 320 is shown in FIG. 13. The modified RFID device 320 shares the same basic layout and structure as the RFID tag 50 shown in FIG. 12. The modified RFID device 320 has a modified RFID antenna structure 650. The modified RFID device 320 differs from the RFID 50 only in that the modified RFID tag 320 has a plurality of scallops 330 provided in the periphery portion of the modified RFID antenna structure 650. It should be understood that any design or additional cuts may be made in the antenna structure in order to create the anticipated final design.

It should be noted that the supplementary cutting path 310 is designed only to make alterations to the shape of the standard antenna structure so as to provide further flexibility with the standard antenna design. The second laser cutter 285 can also be used to radically alter the physical appearance of the standard antenna structure.

Referring back to FIG. 10, the RFID tag web 605 exits the second laser cutter as a modified RFID tag web 610. The modified RFID tag web 610 has a succession of modified RFID tags disposed on the carrier layer. The modified RFID tag web 610 is fed into a separator 290. The separator 290 removes the completed modified RFID tags from the carrier layer 130 so that the completed modified RFID tags may be further processed. The carrier layer 615 is then wound into a carrier roll 300 by a third rewinder 305.

Figure 14:
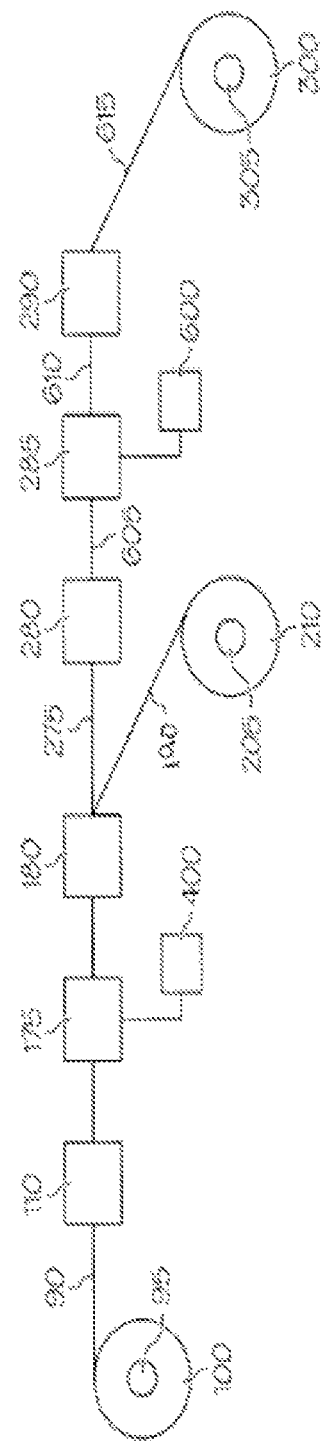
FIG. 14 depicts another roll-to-roll process for manufacturing modified conductive structures in accordance with an aspect of the present invention.

It is contemplated that the roll-to-roll process depicted in FIG. 3 and the roll-to-roll-process depicted in FIG. 10 may be combined to create another roll-to-roll process of manufacturing modified RFID tags, depicted in FIG. 14. It should be understood that while the present invention is described as a roll to roll arrangement using a web, the invention may be practiced in a sheet fed configuration.

Figure 15:
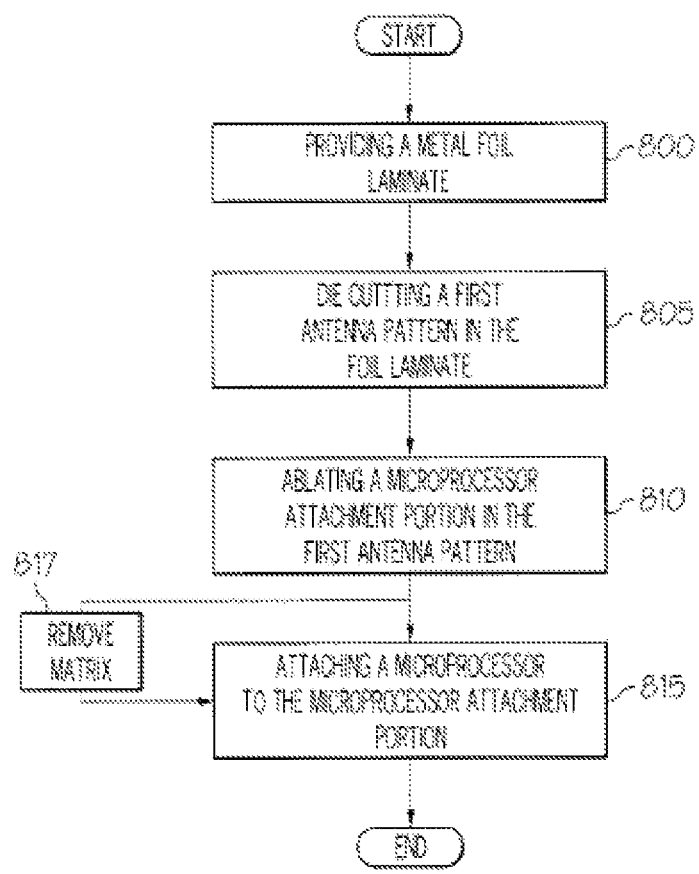
FIG. 15 illustrates a methodology of creating a standard conductive structure in accordance with an aspect of the present invention.

FIG. 15 illustrates a methodology of forming a conductive structure. The methodology begins at 800, where a metal foil laminate disposed on a carrier layer is provided. The metal foil laminate can include a metal foil layer bonded to a reinforcement layer by an adhesive layer or alternately, the foil layer may be of sufficient strength for processing without tearing. The reinforced metal foil laminate can be bonded to the carrier by an adhesive layer. At 805, a first cut produces, for example, an antenna structure made from the metal foil laminate up to the carrier layer. The initial structure, here an antenna, does not, for example, include the finished designs such as a microprocessor attachment portion. At 810, a laser modifies the first conductive structure to create a standard structure by ablating the reinforced metal foil laminate up to the carrier layer in the first conductive structure cut by the first cutter to create, in this example, a microprocessor attachment portion. The laser attachment portion can include at least two microprocessor contact ends separated by a gap. The methodology concludes at 815, with the attachment of a microprocessor to the microprocessor attachment portion. Alternatively, at step 817, where matrix removal is required, a stripper removes the matrix portion of the reinforced metal foil laminate from the antenna structure such that only the antenna structure remains on the carrier layer. It should be understood, that no matrix may be removed, or it may only be removed at select potions of the process such as when a rotary die cutter or cold foil process is used and not in other instances for example when a laser cutting device is used. Alternatively, no matrix may be removed from the structure and the entire material can be ablated away.

Figure 16:
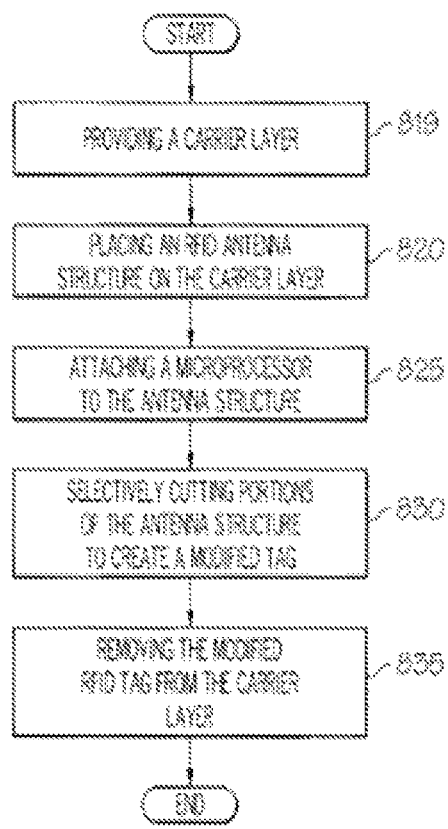
FIG. 16 illustrates a methodology of creating a modified conductive structure in accordance with an aspect of the present invention.

FIG. 16 illustrates an exemplary embodiment for manufacturing a modified RFID tag. The methodology begins at 819 by providing a carrier layer and then, at 820, disposing a conductive structure on a carrier layer. The conductive structure has more of the finished structures, such as in this example an antenna with a microprocessor attachment portion that includes at least two microprocessor contact ends separated by a gap. The finished antenna structure may be created by the methodology described in detail above illustrated in FIG. 15, or by any suitable method that creates a gap that is narrow enough to allow a microprocessor to bridge the gap without the use of contact extensions. At 825, a microprocessor is secured to the antenna structure to create a direct electrical connection between the antenna structure and the microprocessor, thereby creating a RFID tag. The microprocessor extends over the gap and while being secured to both of the at least two contact ends. At 830, a laser ablates select portions of the antenna structure to modify the shape of the RFID antenna to create a modified RFID tag. The methodology concludes at 835, where the modified RFID tag is removed from the carrier layer to allow for further processing.

Figure 17:
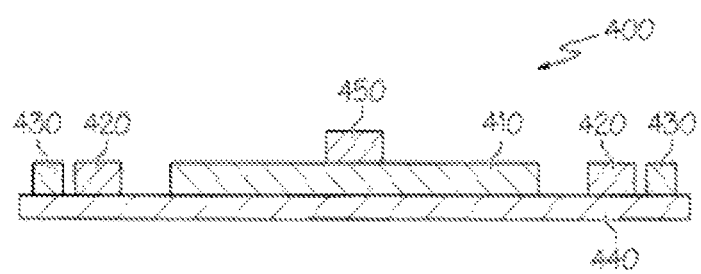
FIG. 17 provides a side elevation of a conductive laminate produced in accordance with the present invention.

Reference is now directed to FIG. 17 in which a side elevation of a conductive laminate is shown generally by reference to numeral 401. The laminate 401 includes a first pattern 410, a second pattern 420 and a third pattern 430 each of which is disposed on a carrier layer 440. The patterns are created for example by laser cutting such that no visible marks, burns, irregularities may be made on the surface of the carrier layer of substrate. The patterns are generally distinguishable from one another, may cooperate with one another or may be partially coincident with one another.

Figure 18:
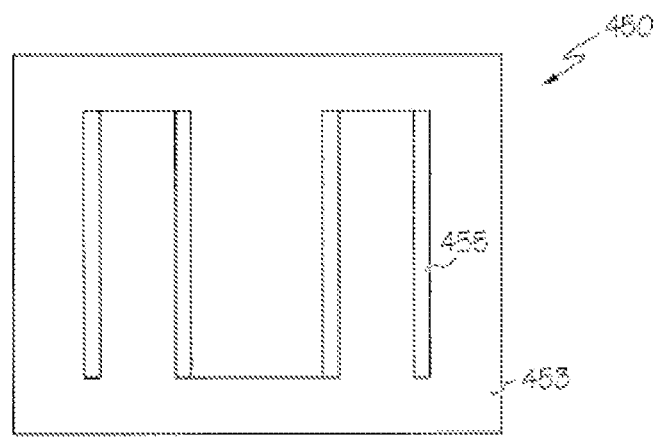
FIG. 18 shows an exemplary photovoltaic intermediate as produced in accordance with the present invention.
Figure 19:
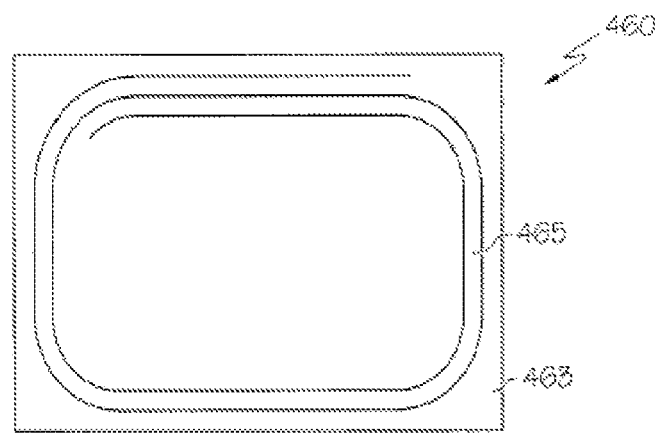
FIG. 19 illustrates an exemplary RFID circuit intermediate as produced in accordance with the present invention.

FIG. 18 shows a conductive structure intermediate for use with a chip 450, particularly an RFID chip., with a conductive pattern 455 created in the foil layer on the substrate 453. FIG. 19 provides a conductive structure used for a circuit 460 for example used with smart cards, which includes a conductive pattern 465 provided on a substrate 463.

The present invention also contemplates that the foil laminates may be patterned in the foil laminate layer in a geometrical shape such as a bow that may be utilized for a strap attachment mechanism for an RFID device.

It will thus be seen according to the present invention a highly advantageous method for producing conductive laminate structures has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A method of making a metal foil laminate of an antenna structure in a roll to roll process comprising;
    providing a first web of material in a continuous format;
    applying a pattern of adhesive to a first face of the first web of material;
    selectively deadening portions of the adhesive;
    providing a second web of conductive material;
    positioning the second web of conductive material over the pattern of adhesive to form a foil laminate;
    cutting the foil laminate at a first cutting station to form an intermediate shape;
    advancing the foil laminate having the intermediate shape to a second cutting station;
    cutting the intermediate shape at the second cutting station by continuous ablation to form a finished antenna structure with at least an opening to receive an integrated circuit, wherein the selectively deadening portions of the adhesive occurs in areas of the first web material that are outside of an area of the finished antenna structure.

2. The method of claim 1, wherein the first cutting station comprises a laser.

3. The method of claim 1, wherein the second cutting station comprises a laser.

4. The method of claim 1, wherein cutting the intermediate shape by continuous ablation forms a finished antenna structure with a first electrical contact separated from a second electrical contact.

* * * * *